United States Patent [19]

Hartemann et al.

[11] Patent Number: 5,068,860
[45] Date of Patent: Nov. 26, 1991

[54] HELICAL WIGGLER DEVICE WITH PERMANENT MAGNETS FOR APPLICATION TO FREE ELECTRON LASERS

[75] Inventors: Frederic Hartemann, Cambridge, Mass.; Michel Bres, Versailles; Roger Teillard, Beynes, both of France

[73] Assignee: Thomson Tubes Electroniques, Boulogne Billancourt, France

[21] Appl. No.: 683,070

[22] Filed: Apr. 10, 1991

Related U.S. Application Data

[63] Continuation of Ser. No. 528,053, May 23, 1990.

[30] Foreign Application Priority Data

May 30, 1989 [FR] France .................................. 89 07082

[51] Int. Cl.$^5$ .............................................. H01S 3/00
[52] U.S. Cl. .......................................... 372/2; 372/37
[58] Field of Search ...................................... 372/2, 37

[56] References Cited

U.S. PATENT DOCUMENTS

| | | | |
|---|---|---|---|
| 4,425,649 | 1/1984 | Elias et al. | 372/2 |
| 4,442,522 | 4/1984 | Brau et al. | 372/2 |
| 4,543,655 | 9/1985 | Condel Jr. | 372/2 |

OTHER PUBLICATIONS

Ashkenazy et al., "Analysis and Measurements of Permanent Magnet & Bifilar" Helical Wigglers, EDEJQE, vol. 23, No. 5, May 1983.

*Primary Examiner*—Léon Scott, Jr.
*Attorney, Agent, or Firm*—Roland Plottel

[57] ABSTRACT

Disclosed is a magnetic assembly setting up a helical field of variable amplitude along the axis of the helix, using permanent magnets. The disclosed device is a wiggler with adiabatic insertion for application to free electron lasers and, for this use, it has advantages of simplicity of construction and implementation.

11 Claims, 6 Drawing Sheets

HELICAL WIGGLER DEVICE WITH PERMANENT MAGNETS FOR APPLICATION TO FREE ELECTRON LASERS

This application is a continuation of application Ser. No. 07/528,053, filed 5/23/90.

BACKGROUND OF THE INVENTION

In free electron lasers, the radiation is obtained by the modulation of the electron impulse in a vacuum. The Maxwell equations describe the radiation emitted by an electrical charge that undergoes an impulse variation dp due to an external field F, generally in the presence of electrical and magnetic fields. The amplitude of the radiation varies as a function of the of the variation of the impulse dp.

The amplitude of the electron radiation emitted by an electrical charge in non-uniform motion depends on the mass m of the particle, the variation in energy being distributed among a variation in mass, a variation in velocity and a radiation.

The intensity of the radiation is all the greater as the acceleration or, more precisely, the variation in the impulse of the particle is greater (this covers variations in both mass and position). In particle accelerators with a circular geometry, in which the particles are forced, by magnetic fields, to follow circular orbits and, consequently, undergo a constant variation of their the radiation emitted by particles of low mass (such as electrons or positrons) is particularly intense. This radiation, which is called synchrotron radiation after the first particle-accelerating machines wherein the phenomenon was observed, has long been considered a major drawback of circular accelerators for electrons.

The seventies saw the development of specialized laboratories putting non-coherent, polychromatic, synchrotron radiation to use in studies on the structure of condensed matter. The synchroton light is pulsed whenever the electron beam passes before the radiation-extraction window. This pulsed light, with very brief and highly characterized pulses, is well suited to kinematic studies at time scales from the picosecond range to the millisecond range.

Just like the radiation emitted by a standard laser, a radiation that is coherent in phase and monochromatic can be obtained generally around relativistic beams by subjecting the electrons to periodic deviations perpendicular to their mean trajectory. This is the principle of the structure of the "free electron laser" working, again in the relativistic field, on the basis of the time-contraction effect, between a reference frame related to the beam and a fixed reference frame, the deviations "seen by the beam" being observable in the fixed reference frame at a far higher frequency.

The radiation of a free electron laser comes from the addition of the radiations emitted by each of the "sources" formed by the deviations of beams and is therefore not homogeneous in the space surrounding the sources, because the radiations coming from the different sources are not in step with one another at a given point. Because of the phase relationships among the sources created by the shape of the wiggler, the radiation of a free electron laser is coherent.

The device used to obtain the periodic deviations of the electrons is called a "wiggler" because, in its simplest design, the device makes the path of the electrons "wiggle". It is easy to imagine the waves described by the path of the electrons when they go through a region where alternating magnetic or electrical fields deflect the electrons in either of the directions perpendicular to that of their velocity.

The alternating fields of the wiggler can be obtained by the alternation of permanent magnets or by making current flow in coils around the path of the beam. The geometry of such devices around the beam determines the interaction with the electrons so as to "wiggle" their paths and obtain the laser effect.

It would appear, furthermore, that for industrial-scale applications, wigglers with permanent magnets have numerous advantages over double helix wigglers in which the fields are produced by making currents flow in helical coils. For, wigglers with permanent magnets make it possible to avoid the consumption and heat dissipation problems associated with wigglers supplied with current. Furthermore, in the case of short pulses, the need for synchronization between the supplies of the wiggler and the beam is removed. For continuous applications, the usefulness of permanent magnets is obvious.

In practical wiggler structures, the magnetic fields chiefly have two geometries: either a geometry of linear polarization, perpendicular to the path of the electrons, or a geometry of helical polarization.

Helical polarization has the advantage of preventing the problem of the drift of the beam in a magnetic guiding field and possesses a higher degree of symmetry. In particular, the longitudinal component of the magnetic field is zero on the axis. Furthermore, this polarization focuses the beam in two dimensions.

To obtain the optimum functioning of the free electron laser (FEL), the electron beam has to be injected into a wiggler with adiabatic insertion. This means that the fields of the wiggler rise towards their maximum value gradually from the point where the electrons are injected.

The adiabatic profile may be obtained in different ways: by magnetic diffusion when the wiggler field is obtained by a current pulse, by changing the radius of the helical coils, or by shunting the current the flows in the wiggler. In the prior art wigglers with permanent magnets, the adiabatic profile can be obtained by giving the wiggler field a stepped profile using metal pieces of variable thickness and high magnetic permeability. It must be noted that this rules out the use of this type of wiggler in conjunction with an external focusing field because the parts that create the stepped profile disturb both the wiggler field and the guiding field, the latter being indispensable to any application of power under high current.

The present invention enables these drawbacks to be overcome while at the same time making it possible to obtain a continuous and adiabatic increase of the magnetic field in the insertion region.

SUMMARY OF THE INVENTION

An object of the invention is a magnetic assembly that sets up a helical field of variable amplitude along the axis of the helix using permanent magnets. The device according to the invention can be used as a wiggler, with adiabatic insertion profile, for application to free electron lasers, said wiggler having an insertion region with a profile of increasing amplitude of magnetic fields and a region of interaction in which the amplitude of the field of the wiggler is constant. According to a preferred embodiment of the invention, the magnetic fields of said regions of insertion and interaction are produced by identical permanent magnets, only the thickness of which varies along the axis of the wiggler in the insertion region so as to produce the requisite adiabatic profile.

The device according to the invention thus makes it possible to acquire the advantages of the helical wigglers with permanent magnets while, at the same time, avoiding the drawbacks of such devices in the prior art because, for magnets with magnetic permeability close to unity (as is the case, for example, with magnets made of samarium-cobalt), the use of a guiding field no longer raises any problems.

BRIEF DESCRIPTION OF THE DRAWINGS

The invention and the advantages provided by the use of the invention will be understood more clearly through the detailed description given as a non-restrictive example and illustrated by the appended drawings, of which.

DESCRIPTION OF PREFERRED EMBODIMENTS

Figure 1:
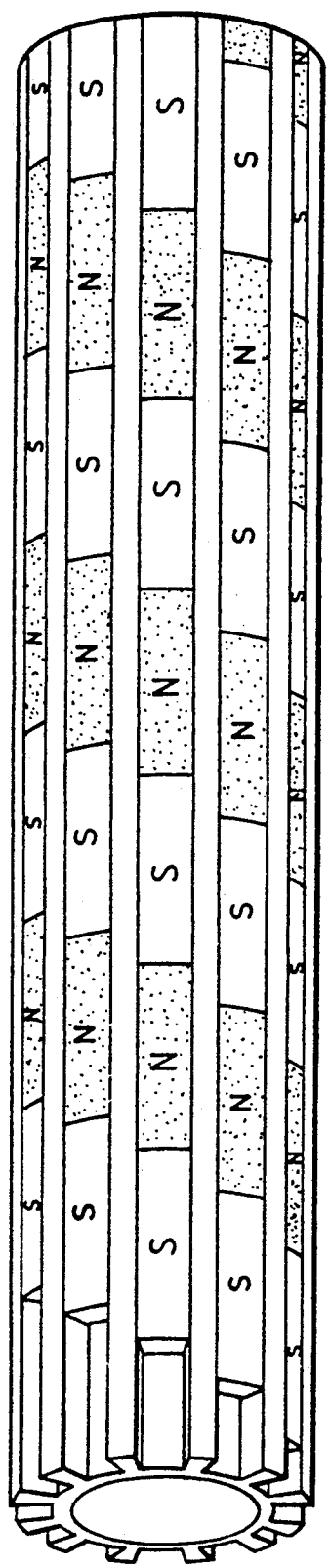
FIG. 1 shows a schematic drawing of the helical wiggler system with permanent magnets according to the prior art, but without any insertion region.

According to a preferred configuration of a helical wiggler with permanent magnets according to the prior art, as shown in FIG. 1, permanent magnets are fixed in the grooves of a non-magnetic sleeve that is made of duralumin, for example, and has an axial symmetry, so that the north poles (N) or the south poles (S) describe a helix in a spiral around the axis of the sleeve.

Figure 2:
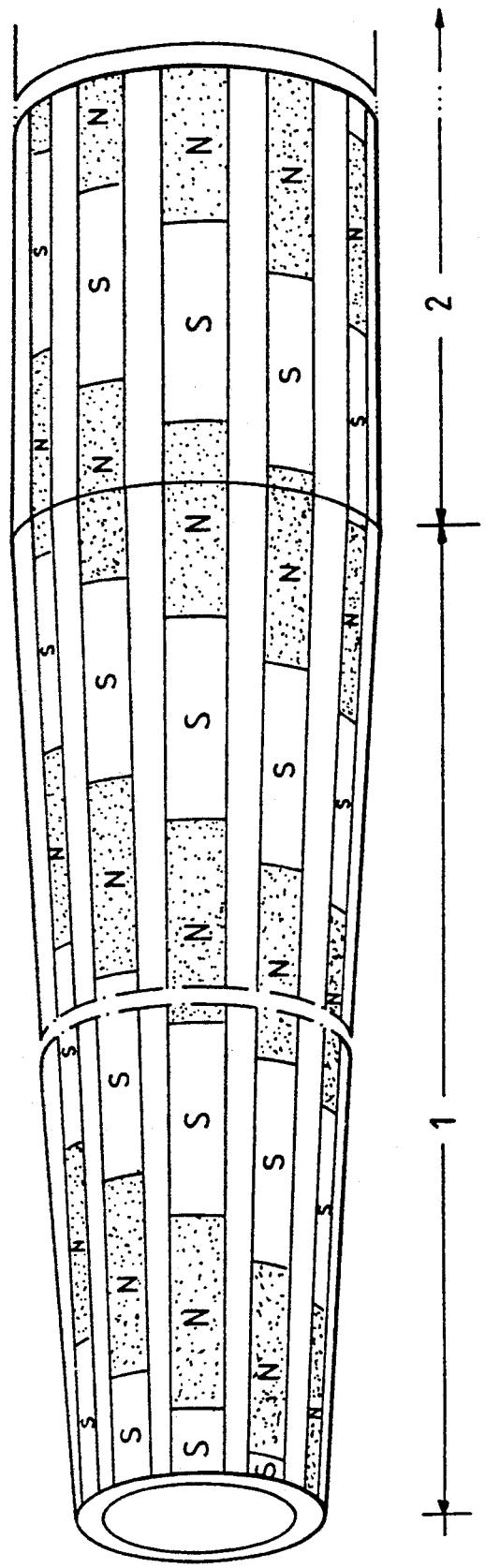
FIG. 2 shows a schematic drawing of the helical wiggler system with permanent magnets with adiabatic insertion region according to the invention.

According to a preferred configuration of a helical ondulator with permanent magnets and with adiabatic insertion according to the invention, as shown in FIG. 2, the interaction region 2 of the wiggler is identical to that of FIG. 1 and, moreover, the magnets are also identical to those of FIG. 1 in the interaction region 2 whereas, in the insertion region 1, the sleeve and the magnets fixed in the grooves are machined with decreasing diameters along the axis, from the interaction region 2 onwards, to describe a conical section, i.e. the thickness of the magnets and, hence, the amplitude of the magnetic field on the axis varies along the axis, adiabatically and continuously from a zero value starting from the insertion of the beam in the insertion region up to its maximum value in the interaction region.

Figure 3:
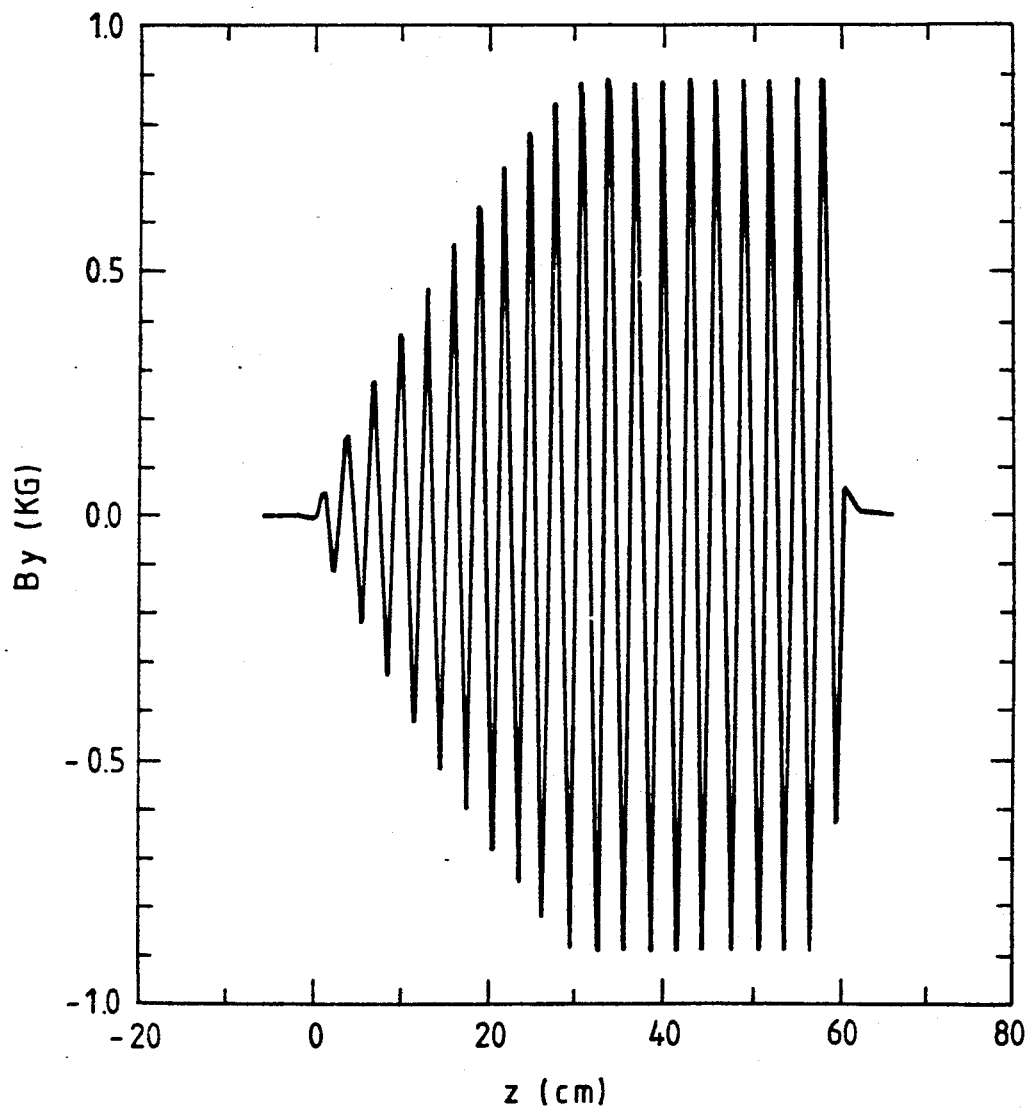
FIG. 3 shows the calculation of the magnetic field on the axis produced by a device according to FIG. 2, namely a helical wiggler with permanent magnets with adiabatic insertion region according to the invention.

FIG. 3 shows the amplitude of the resultant magnetic field on the axis, for a preferred configuration of a wiggler with adiabatic insertion, with the following simulation parameters:

Period: $1=30$ mm
Maximum thickness: $h^w=5$ mm
Width: $e=5$ mm
Distance from the axis: $R=13$ mm
Total number of periods: $N_p=20$
Number of periods of insertion: $N_i=10$
Type of insertion: linear
Material: samarium-cobalt
Surface induction: $B_r=1.07$ T
Coercive induction: $B^*=4$ T The effect of adiabatic increase of the amplitude of the magnetic field from zero to its maximum value of the amplitude of the interaction field is brought out in the graph of this calculation.

Figure 4:
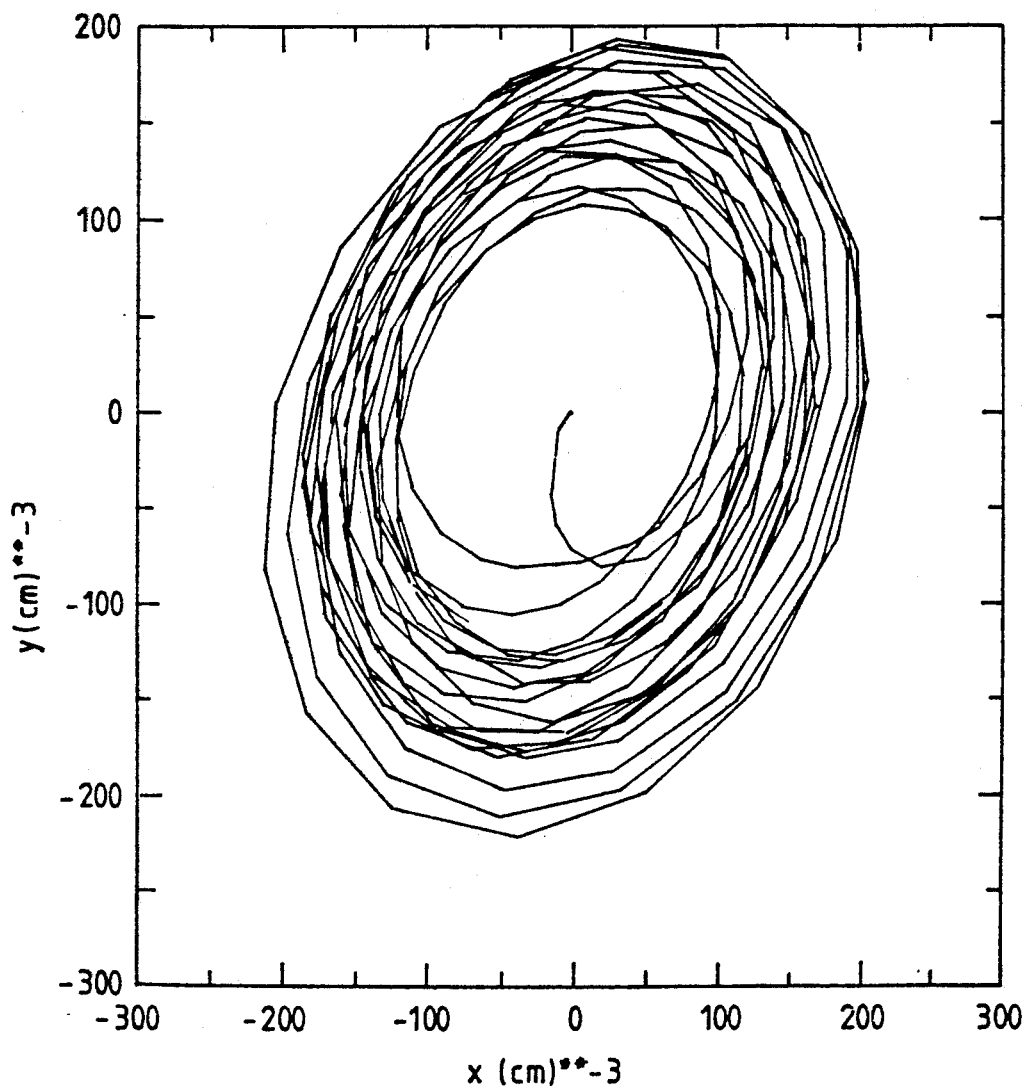
FIG. 4 shows a simulation of the path of an electron penetrating an wiggler without adiabatic insertion, with axial velocity.
Figure 5:
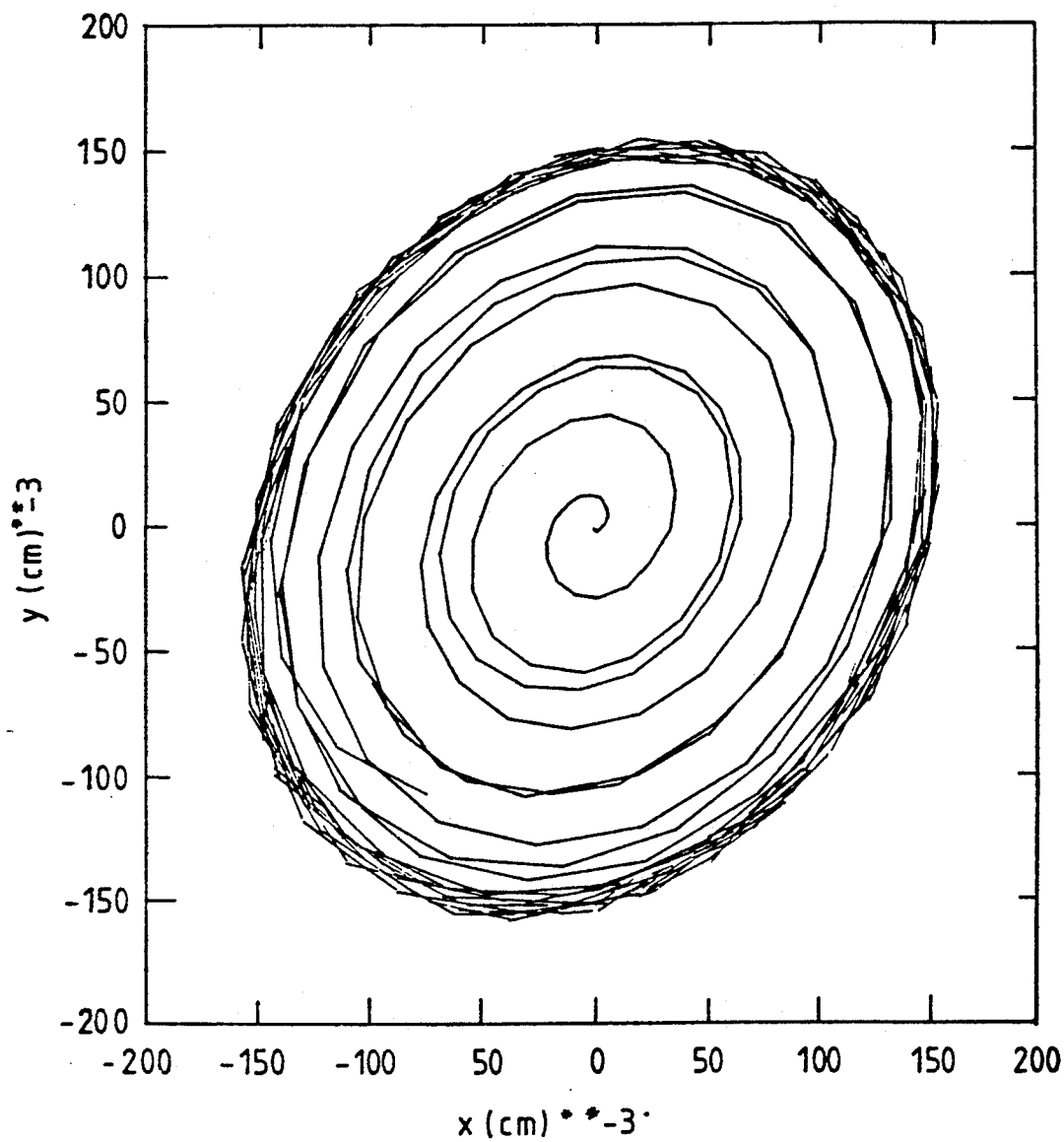
FIG. 5 shows a simulation of the path of an electron penetrating, with axial velocity, a wiggler with a linear variation of the induction in the insertion region.
Figure 6:
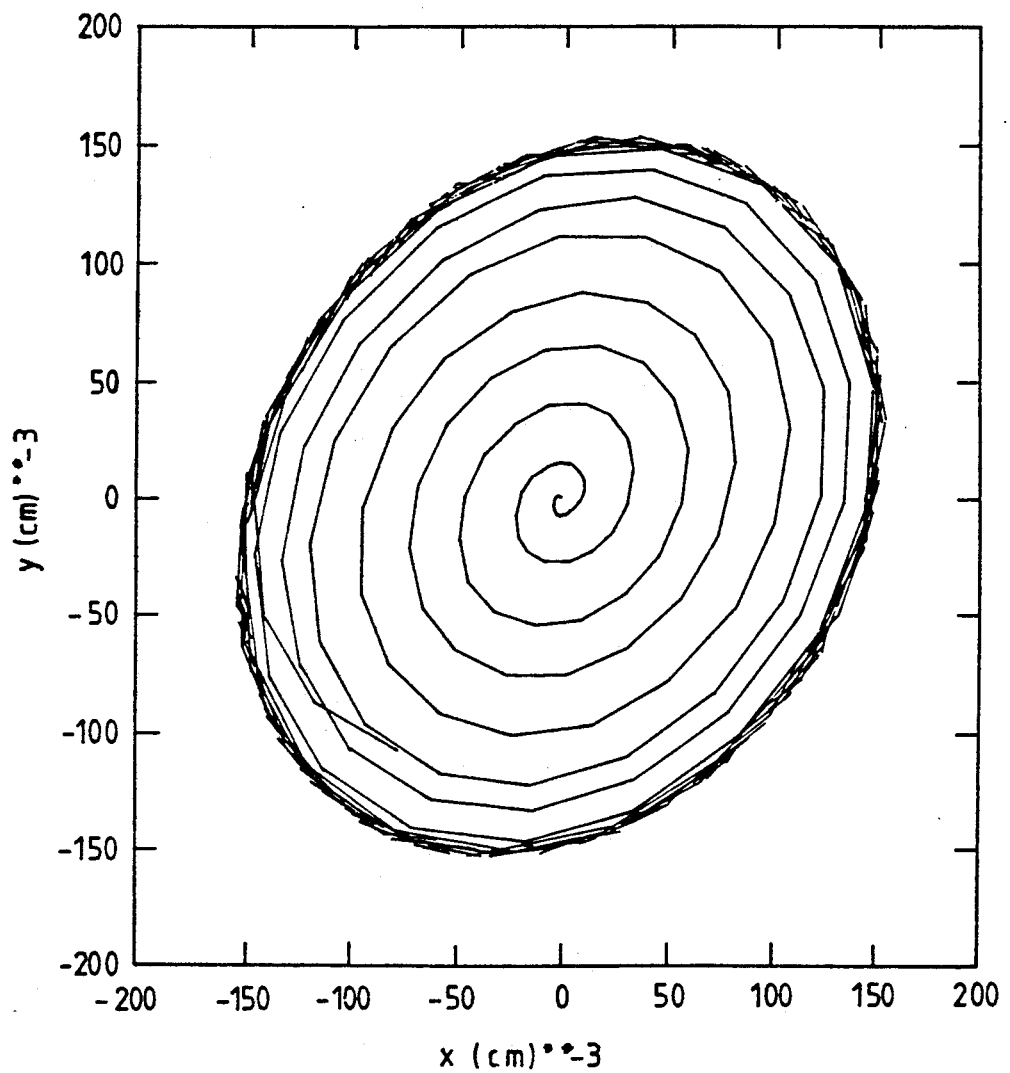
FIG. 6 shows a simulation of the trajectory of an electron penetrating, with axial velocity, a wiggler whose induction varies as $\sin^2$ of axial distance in the insertion region.

FIGS. 4, 5 and 6 show the simulations of electron paths in two dimensions obtained by projection on a plane perpendicular to the axis of the wiggler, for three different profiles of insertion:

FIG. 4: no insertion,
FIG. 5: linear insertion,
FIG. 6: insertion with variation as $\sin^2$ of the distance along the axis.

It is seen, in comparing FIGS. 4, 5 and 6, that the beam has a tendency to oscillate between a diameter of 2 mm and a diameter of 4 mm for the wiggler without adiabatic insertion shown in FIG. 4 whereas there is evidence of a focusing effect in the case of linear insertion (FIG. 5) which brings the beam back to the axis after a number of oscillations and whereas, ultimately, the fastest and sharpest focusing is the one seen in FIG. 6 in the case of adiabatic insertion with variation as $\sin^2$.

Thus very high quality adiabatic insertion is obtained by using this technique.

In particular, the problems of electrical supply and heat dissipation associated with wigglers supplied with current are completely avoided as are the problems of synchronization for pulse wigglers. At the same time, the costs of the wigglers are reduced and their reliability is increased.

What is claimed is:

1. A magnetic assembly for a free electron laser comprising a non-magnetic mechanical support having a longitudinal axis of symmetry,
a plurality of permanent magnets arranged on the outer surface of said mechanical support in a manner to generate a helical magnetic field centered about said longitudinal axis, the thicknesses of said permanent magnets varying in thickness along a first position of said longitudinal axis in a continuous manner and being constant in thickness along a second portion of said longitudinal axis whereby the magnetic field along said longitudinal axis varies in a adiabatic manner from zero at the start of said first portion to a maximum at the end of said first portion and remains at said maximum for the length of said second portion for fast and sharp focusing of electrons flowing along said longitudinal axis, said variation in magnetic field being a consequence only of said variation in the thicknesses of said permanent magnets without the addition of any screening material for disturbing the magnetic field produced by the permanent magnets along that might degrade the performance of the free laser under high beam current conditions of operation.

2. The magnetic assembly of claim 1 in which the permanent magnets have a permeability of about unity.

3. The magnetic assembly of claim 1 in which each of the permanent magnets has the same length and the same width and the magnets along the first portion vary in thickness to achieve the adiabatic variation in magnetic field along the first portion.

4. The magnetic assembly of claim 3 in which the variation in thickness of the permanent magnets along the first portion is such as to create a $\sin^2$ variation in the magnetic field along the first portion.

5. The magnetic assembly of claim 4 in which the inner radius of the mechanical support is uniform along its length and the radius of the inner surface formed by the plurality of permanent magnets is uniform along the length of the mechanical support and the outer surface formed by the plurality of permanent magnets is conical along the first portion of the longitudinal axis and circularly cylindrical along the second portion of the longitudinal axis.

6. In a free electron laser assembly that includes: a laser tube portion and a magnetic structure surrounding the laser tube portion for creating a helical path for electrons along a longitudinal axis, a magnetic structure comprising means including a plurality of permanent magnets for generating along said longitudinal axis a helical magnetic field that has an insertion portion along which the magnetic field varies in a continuous and adiabatic manner from zero to a maximum strength and an interaction portion along which the magnetic field is uniform at said maximum strength for sharp and fast focusing of electrons flowing along said longitudinal axis, characterized in that magnetic structure is free of means for screening the magnetic field of the permanent magnets from the longitudinal axis.

7. A magnetic structure according to claim 6 in which the means including the permanent magnets for generating the helical magnetic field has an inner surface and an outer surface and is further characterized in that the inner surface is circularly cylindrical along its full length and the outer surface forms a conical section along the insertion portion of said longitudinal axis as a consequence of a taper in thickness of the permanent magnets therealong and is circularly cylindrical along the interaction portion of said longitudinal axis as a consequence of a uniformity in thickness of the permanent magnets therealong.

8. A magnetic structure according to claim 7 in which the magnetic field generated along the insertion portion of the longitudinal axis has a $\sin^2$ variation for achieving an adiabatic magnetic intensity profile.

9. The method of forming a magnetic structure, for use in a free electron laser, that generates a helical magnetic field, along a longitudinal axis, that has a first varying portion and a second uniform portion comprising the steps of forming an assembly by positioning a plurality of uniform permanent magnets in grooves of a hollow nonmagnetic support having a circularly cylindrical inner surface centered about a longitudinal axis and having grooves in its outer surface that are longitudinal and have a depth and a width that match the thickness and width of the permanent magnets, the direction of the grooves being such that the assembly provides a helical magnetic field along the longitudinal axis, and machining the outer surface of the assembly for forming a portion in which the permanent magnets therealong have a reduced thickness that is tapered for reducing the helical magnetic field generated along the corresponding portion of the longitudinal axis.

10. The method of claim 9 in which the machining is limited to said portion, leaving the permanent magnets in the remainder of the assembly at the initial thickness.

11. The method of claim 10 in which the thicknesses of the permanent magnets are reduced to provide a $\sin_2$ variation of the magnetic field along the corresponding portion of the longitudinal axis.

* * * * *